Patented Apr. 18, 1950

2,504,497

UNITED STATES PATENT OFFICE 2,504,497

CATALYSTS SUITABLE FOR DEHYDROGENATION PROCESSES

Ernest Charles and Pierre Robinet, Clamecy, France, assignors to Societe Normande De Produits Chimiques, Paris, France, a corporation of France No Drawing. Application September 20, 1948, Serial No. 50,236. In Canada February 11, 1947

10 Claims. (Cl. 252—463)

This application relates to catalysts suitable for dehydrogenation processes and is a continuation-in-part of our application Serial No. 728,200 filed 12th February, 1947, now abandoned.

It is well-known that esters may be obtained by the dehydrogenation of alcohols. In particular, the possibility of preparing methyl formate by the dehydrogenation of methanol has been known since 1916 (Mannich and Gilmann, Berichte, 49, 586) and the equilibrium of this reaction was determined in 1926 by Christiansen (J. Chem. Soc. 1926, 413). Up to the present time, however, this process has not proved industrially practicable since the usual catalysts, such as those obtained by reduction of metallic oxides and applied, generally, on a non-metallic support such as pumice or kieselguhr, have not proved sufficiently effective. In this connection reference may be made to the publication La Catalyse en Chimie Organique (Catalysis in Organic Chemistry) by Sabatier.

Thus, in the production of methyl formate according to the reaction:

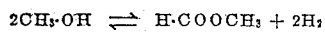

$$2CH_3 \cdot OH \rightleftharpoons H \cdot COOCH_3 + 2H_2$$

the catalysts referred to above have proved of such low activity and so difficult to reproduce that in operating the process industrially apparatus of very considerable size was necessary and even so a large proportion of the product was lost by decomposition of the methanol into carbon monoxide, carbon dioxide and methane. Thus the chemical yield was low and the production costs high. Further, the low coefficient of heat transmission of these catalysts tended to facilitate secondary reactions and local overheating and thus shortened the life of the catalyst.

In recent years attempts have been made to produce catalysts having a high coefficient of heat transmission so that the introduction of heat or its abstraction, accordingly as the reaction involved may be exothermic or endothermic, is facilitated. Of such catalysts perhaps the most useful have been those of the Raney type and these have proved successful for reactions in the liquid phase but are scarcely of practical value for reactions in the vapour phase. An improved form of catalyst has been developed by Tischenko and consists of aluminium alloy pellets which are activated by treatment with caustic soda, but unfortunately even this form of catalyst is not wholly satisfactory since the pellets create high charge losses in the furnaces and very often cause premature clogging.

It is an object of the present invention to produce catalysts of cavernous alloy skeleton structure which are of particular value in the conversion of alcohols to esters and particularly the conversion of methyl alcohol to methyl formate.

According to the present invention a catalyst suitable for the dehydrogenation of alcohols comprises a cavernous skeleton catalytic mass consisting essentially of separate and hollow pieces of which the smaller dimensions are not less than 6 mm., formed of an aluminium-copper alloy and the surface of which is porous and consists largely of active copper.

The catalysts of this invention are distinguished from those of Raney and those of Dolgov (J. Gen. Chem. U. S. S. R. 6, 1456, (1936)) in that these latter consists essentially either of a powder or at most of very small grain structure. The same difference exists between the catalysts of this invention and those of Tischenko (J. Applied Chem. U. S. S. R., 14 393 (1941)) in that the latter are formed as pellets of 3 to 4 mm. in diameter presenting a small percentage of active copper.

The present invention further provides a process for the production of the aforesaid cavernous skeleton catalysts which comprises converting an aluminium copper alloy into cavernous pieces of smaller dimensions not less than 6 mm. and treating the pieces with an agent which attacks and dissolves away aluminium thus imparting to the pieces a porous surface consisting largely of copper adherent to the alloy skeleton. Preferably the so-treated pieces are washed with water and then with an alcohol and are stored under alcohol. Where they are to be used for the dehydrogenation of methanol or other alcohol, it is convenient to use that alcohol for the washing and preserving medium.

Thus, in general terms the production of the catalysts of this invention may be effected as follows. An aluminium-copper alloy, to which other activating metals may be added if desired, is prepared by bringing 100 parts of aluminium to red heat and introducing into the fused mass thus obtained from 10 to 100 parts, preferably 50 to 70 parts and optimally about 60 parts, of copper, the whole mass being constantly agitated. Any desired additional activating metals may be added and when a homogenous fluid mass is obtained it is poured, in a thin stream of substantially constant section, through an orifice pierced in a refractory crucible onto the surface of water contained in a tank, the water being vigourously agitated, for example by means of a turbine.

The alloy is thus produced in the form of cavernous pieces and though the size of the pieces may vary it is found that pieces of mean dimensions about 10 mm. are most useful for operating in catalytic tubes of 40 mm. diameter.

The cavernous pieces thus obtained are plunged into a solution of caustic soda, caustic potash or other alkaline agent which attacks aluminium for a time sufficient to dissolve out part at least of the aluminium from the surface of the pieces. Preferably the treatment is conducted so that the product contains from 6 to 35%, optimally 12 to 18%, of active copper mainly concentrated at the surfaces of the pieces, such surfaces having a porous structure.

The pieces are then well washed with water and then with methanol or any other alcohol with which the catalyst may be intended to be used, and is stored under the alcohol so that the freshly prepared surfaces are not exposed to risk of oxidation in the air.

The following example will serve to illustrate the invention but is not to be regarded as limiting it in any way.

Example 508 g. of cavernous alloy pieces are prepared by pouring into water with strong agitation a molten alloy consisting of 100 parts of aluminium and 60 parts of copper. These alloy pieces are placed in a metal basket and the whole immersed in 3 litres of caustic soda (15° Bé.). At the end of about 20 minutes the gas liberated amounts to about 30 litres and the temperature of the liquid has risen to about 45° C. The evolution of hydrogen is then accelerated and in order to prevent an evolution greater than a rate of about 450 litres per hour it is frequently necessary to withdraw the basket from the liquid for short intervals. The whole operation is usually completed in about 50 minutes, the temperature of the bath then being about 98° C. and the total volume of hydrogen liberated being about the 144 litres required to produce a catalyst containing about 15% of active copper. The product is then washed with water and with methanol, the yield being about 400 g.

The catalyst thus obtained is of especial value in the conversion of methanol to methyl formate in accordance with the method set forth in our co-pending application No. 50,237 filed on even date herewith and leads, as explained therein, to much higher yields of methyl formate than can be obtained using the classic type of copper-chrome catalyst on kieselguhr, the Dolgov catalyst on pumice (this catalyst not being usable industrially except on a support, because of its friability) or the Tischenko type of catalyst. It has a very low tendency to give rise to secondary reactions, it has a very long life and greater activity than the hitherto known catalysts and it has a high coefficient of heat transmission, giving in thick layers lower charge losses than the known catalysts and permitting a higher passage velocity of the alcohol vapours to be converted and in consequence a higher hourly production of ester.

Finally it may be mentioned that in ordinary use the catalyst maintains its activity for at least 3 to 4 weeks and can then be revived by a simple treatment with caustic soda followed by washing. If this is effected in the catalytic apparatus itself the catalyst remains active for as long as two months.

We claim:

1. A catalyst suitable for the dehydrogenation of alcohols which comprises a cavernous skeleton catalytic mass consisting essentially of separate and hollow pieces of which the smaller dimensions are at least 6 mm., formed of an aluminium-copper alloy and the surface of which is porous and consists largely of active copper.

2. A catalyst suitable for the dehydrogenation of alcohols which comprises a cavernous skeleton catalytic mass consisting essentially of separate and hollow pieces of which the smaller dimensions are at least 6 mm., formed of an aluminium-copper alloy structure consisting essentially of 100 parts of aluminium and 10 to 100 parts of copper and the surface of which is porous and consists largely of active copper.

3. A catalyst suitable for the dehydrogenation of alcohols which comprises a cavernous skeleton catalytic mass consisting essentially of separate and hollow pieces of which the smaller dimensions are at least 6 mm., formed of an aluminium-copper alloy structure consisting essentially of 100 parts of aluminium and 50 to 70 parts of copper and the surface of which is porous and consists largely of active copper.

4. A catalyst suitable for the dehydrogenation of alcohols which comprises a cavernous skeleton catalytic mass consisting essentially of separate and hollow pieces of which the smaller dimensions are at least 6 mm., formed of an aluminium-copper alloy structure consisting essentially of 100 parts of aluminium and 60 parts of copper and the surface of which is porous and consists largely of active copper.

5. A catalyst suitable for the dehydrogenation of alcohols which comprises a cavernous skeleton catalytic mass consisting essentially of separate and hollow pieces of which the smaller dimensions are at least 6 mm., and the mean dimensions about 10 mm., formed of an aluminium-copper alloy structure composed of 100 parts of aluminium and 50 to 70 parts of copper and the surface of which is porous and consists largely of active copper, the proportion of active copper in the catalyst being about 12 to 18%.

6. A process for the production of a catalyst suitable for the dehydrogenation of alcohols which comprises converting an aluminium-copper alloy into cavernous pieces of smaller dimensions at least 6 mm., and treating the pieces with an agent which attacks and dissolves aluminium, thus imparting to the pieces a porous surface consisting largely of active copper adherent to the alloy skeleton.

7. A process for the production of a catalyst suitable for the dehydrogenation of alcohols which comprises converting an aluminium-copper alloy composed essentially of 100 parts of aluminium and 10 to 100 parts of copper into cavernous pieces of smaller dimensions at least 6 mm., and of mean dimensions about 10 mm., and treating the pieces with an agent which attacks and dissolves aluminium, thus imparting to the pieces a porous surface consisting largely of active copper adherent to the alloy skeleton.

8. A process for the production of a catalyst suitable for the dehydrogenation of alcohols which comprises converting an aluminium-copper alloy into cavernous pieces of smaller dimensions at least 6 mm., and treating the pieces with caustic soda to dissolve away surface aluminium until the product contains from 6 to 35% of active copper mainly concentrated at the surfaces of the pieces.

9. A process for the production of a catalyst suitable for the dehydrogenation of alcohols which comprises converting an aluminium-copper alloy composed essentially of 100 parts of aluminium and 10 to 100 parts of copper into cavernous pieces of smaller dimensions at least 6 mm., and treating the pieces with caustic soda to dissolve away surface aluminium until the product contains from 6 to 35% of active copper mainly concentrated at the surfaces of the pieces.

10. A process for the production of a catalyst suitable for the dehydrogenation of alcohols which comprises converting an aluminium-copper alloy composed essentially of 100 parts of aluminium and 50 to 70 parts of copper into cavernous pieces of smaller dimensions at least 6 mm., and treating the pieces with caustic soda to dissolve away surface aluminium until the product contains from 12 to 18% of active copper mainly concentrated at the surfaces of the pieces.

ERNEST CHARLES.
PIERRE ROBINET.

REFERENCES CITED

The following references are of record in the file of this patent:

UNITED STATES PATENTS

| Number | Name | Date |
|---|---|---|
| 576,773 | Broderick | Feb. 9, 1897 |
| 2,094,117 | Byrkit | Sept. 28, 1937 |
| 2,261,639 | Benner et al. | Nov. 4, 1941 |
| 2,391,283 | Weber et al. | Dec. 18, 1945 |
| 2,440,929 | Brenner et al. | May 4, 1948 |